United States Patent
Wang

(10) Patent No.: US 7,085,369 B2
(45) Date of Patent: Aug. 1, 2006

(54) DIALING METHOD WITH PHONE NUMBER RETRIEVAL USING PARTIAL PATTERN MATCHING

(75) Inventor: Chien-Fa Wang, Banchiau (TW)

(73) Assignee: VIA Technologies, Inc. (TW)

( * ) Notice: Subject to any disclaimer, the term of this patent is extended or adjusted under 35 U.S.C. 154(b) by 434 days.

(21) Appl. No.: 10/302,841

(22) Filed: Nov. 25, 2002

(65) Prior Publication Data

US 2003/0174833 A1    Sep. 18, 2003

(30) Foreign Application Priority Data

Mar. 15, 2002  (TW) ............................... 91104950 A

(51) Int. Cl.
*H04M 1/275*    (2006.01)
*H04M 3/44*    (2006.01)

(52) U.S. Cl. ..................... 379/355.02; 379/216.01; 379/218.01; 379/355.05; 379/355.09

(58) Field of Classification Search ...............
379/355.01–357.05, 140, 419, 216.01, 218.01
See application file for complete search history.

(56) References Cited

U.S. PATENT DOCUMENTS

| 5,708,804 A * | 1/1998 | Goodwin et al. ...... 379/355.09 |
| 6,084,954 A * | 7/2000 | Harless et al. ............... 379/140 |
| 6,766,017 B1 * | 7/2004 | Yang ..................... 379/355.02 |

* cited by examiner

*Primary Examiner*—Harry S. Hong
(74) *Attorney, Agent, or Firm*—Rabin & Berdo, P.C.

(57) ABSTRACT

A dialing method with phone number retrieval using partial pattern matching. First, a partial number string is received. Then, phone number sources are searched to retrieve candidate numbers according to the partial number string. All of the candidate numbers contain the partial number string. Thereafter, a phone number is selected from the candidate numbers, and an outgoing call is placed according to the selected phone number.

13 Claims, 3 Drawing Sheets partial number string= "8545"

sort input "6" → partial number string = "6"

```
02-235789[6]1
090-33[6]291
03-[6]229012
04-8122[6]223x1234
02-22185452x[6]228
``` input "2" → partial number string = "62"

```
090-33[62]91
03-[62]29012
04-8122[62]23x1234
02-22185452x[62]28
``` input "2" → partial number string = "622"

```
03-[622]9012
04-8122[622]3x1234
02-22185452x[622]8
``` input "8" → partial number string = "6228"

DIALING METHOD WITH PHONE NUMBER RETRIEVAL USING PARTIAL PATTERN MATCHING

BACKGROUND OF THE INVENTION

1. Field of the Invention

The present invention relates to a dialing method, and particularly to a dialing method that searches a phone listing such as a phone book, incoming call history, and dialing history data to retrieve phone numbers according to their partial patterns.

2. Description of the Related Art

With advances in mobile communications, various portable communication devices, such as satellite and mobile phones, have become daily necessities. Usually, the phone numbers for outgoing calls are either input directly or retrieved from a phone book, incoming call history, and dialing history data.

In mobile phone systems, a menu is provided from which to browse and select phone numbers. However, it is difficult to find the desired number and time spent searching is extended if the phone book contains many phone numbers.

SUMMARY OF THE INVENTION

It is therefore an object of the present invention to provide a dialing method that searches phone number sources, such as a phone listing, incoming call history, and dialing history data, to retrieve phone numbers according to their partial patterns.

To achieve the above object, the present invention provides a dialing method with phone number retrieval using partial pattern matching. According to one embodiment of the invention, a partial number string is first received. Then, phone number sources are searched to retrieve candidate numbers according to the partial number string. Thereafter, a phone number is selected from the candidate numbers, and an outgoing call is placed according to the selected phone number.

The phone number sources may contain a phone listing such as a phone book, incoming call history, and dialing history data.

According to the embodiment of the invention, the candidate numbers can be sorted according to the matching position of the partial number string in each candidate number or the usage frequency of each candidate number, and the sorted candidate numbers can be displayed.

Further, a digit may be received to be appended to the partial number string to obtain a new partial number string. The phone number sources can be searched to retrieve new candidate numbers according to the new partial number string.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 3 shows an example of searching the phone number sources according to the embodiment of the present invention.

DETAILED DESCRIPTION OF THE INVENTION

Figure 1:
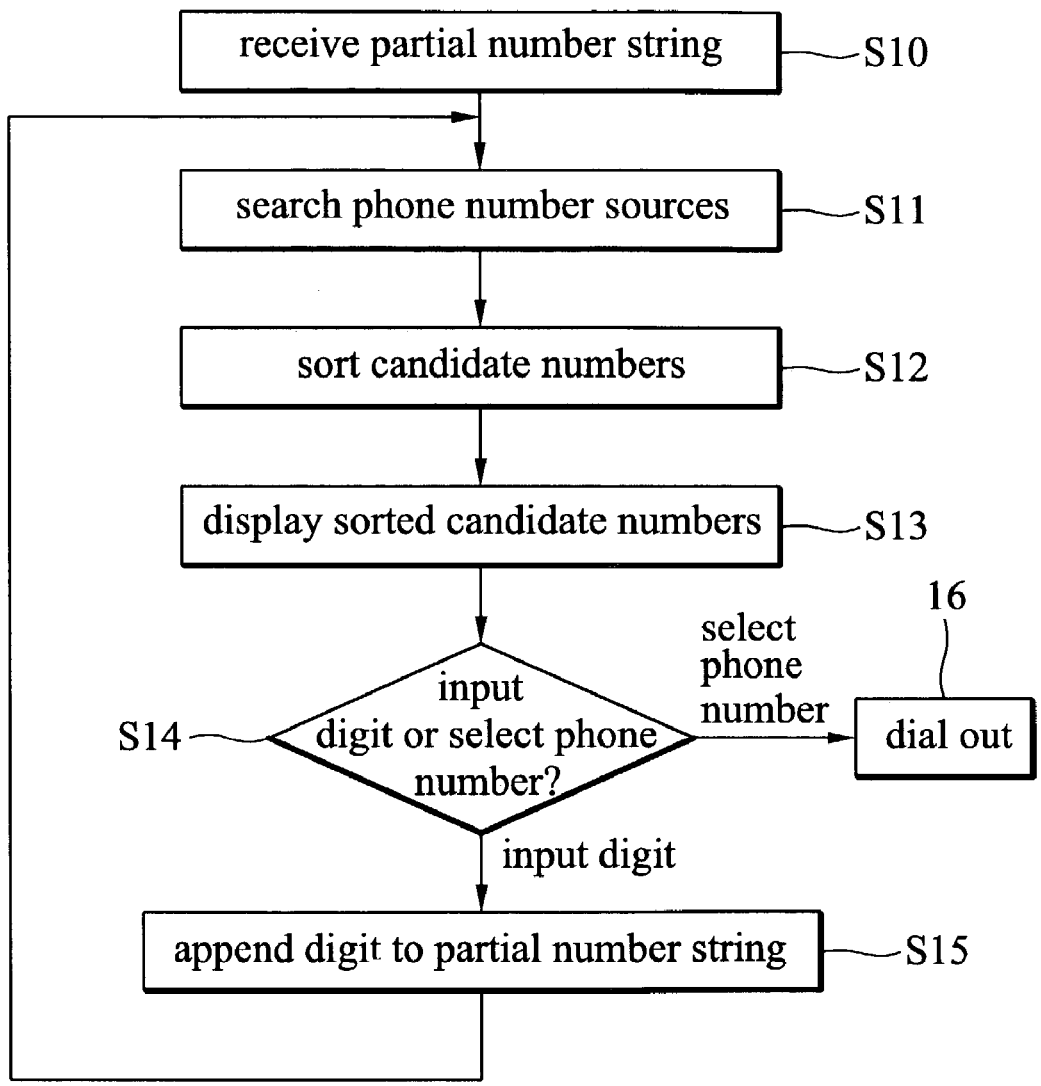
FIG. 1 is a flow chart illustrating the operation of the dialing method according to the embodiment of the present invention.

FIG. 1 is a flow chart illustrating the method according to the embodiment of the present invention.

First, in step S10, a partial number string input by a user is received. Then, in step S11, phone number sources are searched to retrieve candidate numbers according to a partial number string. The phone number sources may contain a phone book, incoming call history, and dialing history data. The partial number string may be located at any position within the candidate numbers, such as the head of a candidate number, the middle of a candidate number, or the end of a candidate number and an extension of candidate number.

Thereafter, in step S12, the candidate numbers are sorted, and in step S13, the sorted candidate numbers are displayed on the screen according to the sorted sequence. It should be noted that the candidate numbers can be sorted according to the matching position of the partial number string in each candidate number or the usage frequency of each candidate number. Details of the sorting process will be discussed later.

Then, in step S14, an input signal is assessed as containing a digit or selecting a phone number from the candidate numbers by user. If a digit is input, the digit is appended to the partial number string to obtain a new partial number string (S15). Then, the process returns to step S11 to search the phone number sources for retrieving new candidate numbers according to the new partial number string. If a phone number is selected from the candidate numbers, an outgoing call is placed according to the selected phone number (S16).

The sorting process is described as follows.

The candidate numbers can be sorted according to the matching position of the partial number string in each candidate number. The priority of a candidate number can be defined according to usual practice. For example, the candidate number will be assigned a high priority when the pattern (partial number string) is matched in the extension of the candidate number; the candidate number will be assigned a medium high priority when the pattern is matched at the head of the candidate number; the candidate number will be assigned a medium priority when the pattern matched at the end of the candidate number; and the candidate number will be assigned a low priority when the pattern matched in middle of the candidate number.

Figure 2:
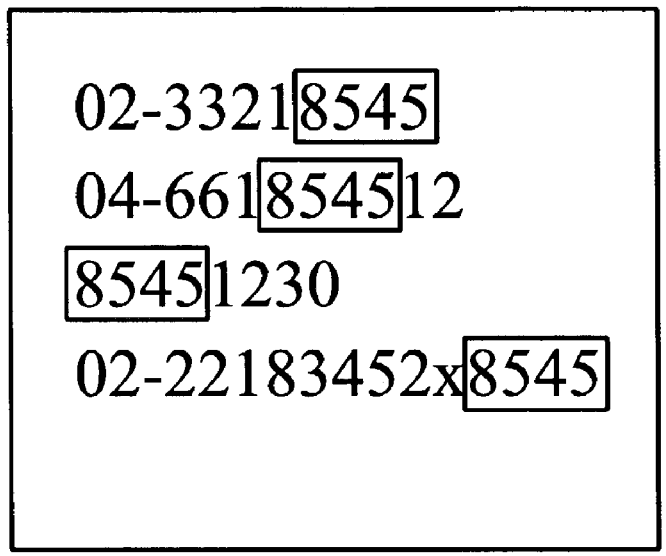
FIG. 2 shows an example of sorting candidate numbers according to the position of the partial number string in each candidate number.
Figure 2:
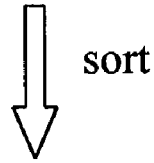
Figure 2:
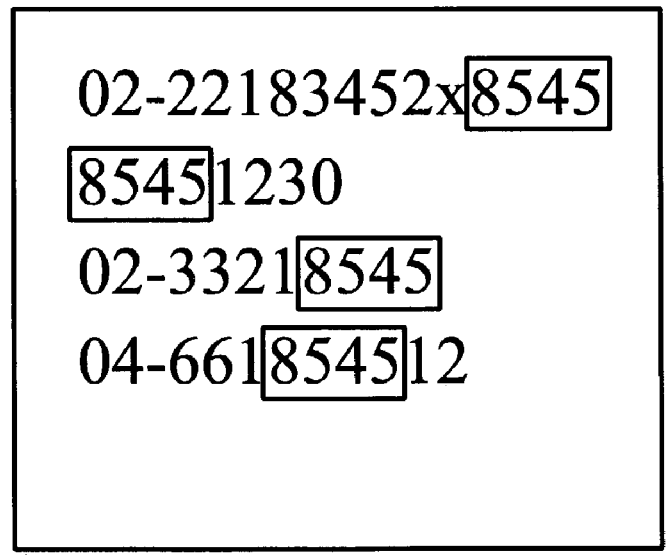

FIG. 2 shows an example of sorting candidate numbers according to the position of the partial number string in each candidate number. As shown in FIG. 2, the example partial number string is "8545" and the candidate numbers containing the partial number string are "02-33218545", "04-661854512", "85451230", and "02-22183452x8545".

According to the priority definition given above, after the sorting process, the candidate numbers are sorted as follows: "02-22183452x8545", "85451230", "02-33218545", and "04-661854512". The candidate number "02-22183452x8545" has High priority in which the partial number string "8545" is matched in the extension of the candidate number; the candidate number "8541230" has Medium High priority in which the partial number string "8545" is matched at the head of the candidate number; the candidate number "02-33218545" has Medium priority in which the partial number string "8545" matched at the end of the candidate number; and the candidate number "04-661854512" has Low priority when the partial number string "8545" matched in the middle of the candidate number.

Further, candidate numbers can be sorted according to the usage frequency thereof. In this case, each candidate number has a MRU (Most Recently Used) value. The MRU value is determined according to usage frequency of each candidate number. The usage frequency may contain dialed frequency and its corresponding date. Therefore, the candidate number has the High priority if dialed frequently and recently.

For example, consider a candidate number that was dialed twice today, five times yesterday, and once two days ago, four times three days ago, and three times four days ago. If the weights of today, one day ago, two days ago, three days ago, and four days ago are 1, 0.9, 0.8, 0.7, and 0.6 respectively, the MRU value of the candidate number is equal to:

$$MRU \text{ value}=(2\times1)+(5\times0.9)+(1\times0.8)+(4\times0.7)+(3\times0.6)$$

FIG. 3 shows an example of searching the phone number sources according to the embodiment of the present invention. First, digit "6" is input, and the partial number string is "6" now. After searching the phone number sources, the retrieved candidate numbers are "02-23578961", "090-336291", "03-6229012", "04-81226223x1234", and "02-22185452x6228". Then, digit "2" is input. The digit "2" is appended to partial number string "6" creating "62". After searching the phone number sources, the retrieved candidate numbers are "090-336291", "03-6229012", "04-81226223x1234", and "02-22185452x6228".

Another "2" is input and the digit "2" is appended to partial number string "62". The partial number string becomes "622". After searching the phone number sources, the retrieved candidate numbers are "03-6229012", "04-81226223x1234", and "02-22185452x6228". Then, "8" is input. The digit "8" is appended to partial number string "622", creating "6228". After searching the phone number sources, only one candidate number "02-22185452x6228" is retrieved. The user can select the candidate number "02-22185452x6228" to dial.

As a result, using the dialing method according to the present invention, phone number sources, including a phone listing such as a phone book, incoming call history, and dialing history data, can be searched to retrieve a phone number according to a partial pattern of the desired phone number, to save time.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A dialing method with phone number retrieval using partial pattern matching, comprising the steps of: receiving a partial number string;

searching phone number sources to retrieve candidate numbers according to the partial number string;

sorting the candidate numbers according to a matching position of the partial number string in each candidate number, the matching position of the partial number string in each candidate number comprising a head, a middle region, an end, or an extension of the respective candidate number;

selecting a phone number from the candidate numbers; and placing a call according to the selected phone number.

2. The method as claimed in claim 1 further comprising displaying the candidate numbers.

3. The method as claimed in claim 1 further comprising inputting a digit.

4. The method as claimed in claim 3 further comprising appending the digit to the partial number string to obtain a new partial number string.

5. The method as claimed in claim 4 further comprising searching the phone number sources to retrieve new candidate numbers according to the new partial number string.

6. The method as claimed in claim 1 wherein the phone number source comprises a phone listing.

7. The method as claimed in claim 1 wherein the phone number sources comprise incoming call history.

8. The method as claimed in claim 1 wherein the phone number sources comprise outgoing call history.

9. The method as claimed in claim 1 further comprising displaying the candidate numbers according to the sorted result.

10. The method as claimed in claim 1 wherein a candidate number will be assigned a high priority when the partial number string is matched in the extension of the candidate number.

11. The method as claimed in claim 1 wherein a candidate number will be assigned a medium high priority when the partial number string is matched at the head of the candidate number.

12. The method as claimed in claim 1 wherein a candidate number will be assigned a medium priority when the partial number string is matched at the end of the candidate number.

13. The method as claimed in claim 1 wherein a candidate number will be assigned a low priority when the partial number string is matched in the middle region of the candidate number.

* * * * *